US012605905B2

(12) United States Patent
    Gallet et al.

(10) Patent No.: US 12,605,905 B2
(45) Date of Patent: *Apr. 21, 2026

(54) GEOMETRY OF A LAYUP SURFACE

(71) Applicant: SAFRAN AERO BOOSTERS, Herstal (BE)

(72) Inventors: Julien Philippe Gallet, Herstal (BE); Michel Wlasow Wlasowski, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 71 days.

This patent is subject to a terminal disclaimer.

(21) Appl. No.: 18/694,792

(22) PCT Filed: Sep. 14, 2022

(86) PCT No.: PCT/EP2022/075556
     § 371 (c)(1),
     (2) Date: Mar. 22, 2024

(87) PCT Pub. No.: WO2023/046553
     PCT Pub. Date: Mar. 30, 2023

(65) Prior Publication Data
     US 2025/0050594 A1      Feb. 13, 2025

(30) Foreign Application Priority Data

Sep. 24, 2021    (BE) .................................. 2021/5753

(51) Int. Cl.
     B29C 33/38          (2006.01)
     B29C 33/48          (2006.01)
     (Continued)

(52) U.S. Cl.
     CPC ........ B29C 70/382 (2013.01); B29C 33/3835 (2013.01); B29C 33/48 (2013.01);
     (Continued)

(58) Field of Classification Search
     CPC .................................................. B29C 33/3835
     See application file for complete search history.

(56) References Cited

U.S. PATENT DOCUMENTS 11,235,492 B2 *   2/2022   Desjoyeaux .............. F02K 1/48
11,472,133 B2 *  10/2022   Desjoyeaux ............ B29C 70/32
                        (Continued)

FOREIGN PATENT DOCUMENTS

FR          3 062 336 B1      4/2019
WO      WO 2012/046020 A1     4/2012

OTHER PUBLICATIONS

International Search Report as issued in International Patent Application No. PCT/EP2022/075556, dated Jan. 16, 2023.

*Primary Examiner* — Atul P. Khare
(74) *Attorney, Agent, or Firm* — CUSHMAN PARTNERS

(57) ABSTRACT

A method for determining a lay-up geometry for creating a component made of composite material, includes a body which is a volume of revolution of axis directed in an axial direction, the body extending around the axial direction in a circumferential direction, and a flange extending from one end of the body in a direction of extension, the method involving determining a first surface having the shape of the body that is to be produced and determining a second surface, situated in the prolongation of the first surface, the second surface having closed curves of undulation in the circumferential direction, wherein the second surface also has corrective curvatures in the direction of prolongation.

8 Claims, 8 Drawing Sheets

(51) Int. Cl.

| | | |
|---|---|---|
| *B29C 70/20* | (2006.01) | |
| *B29C 70/30* | (2006.01) | |
| *B29C 70/38* | (2006.01) | |
| *B29C 70/54* | (2006.01) | |
| *B29L 23/00* | (2006.01) | |
| *B29L 31/00* | (2006.01) | |
| *B29L 31/30* | (2006.01) | |

(52) U.S. Cl.
CPC .......... *B29C 70/205* (2013.01); *B29C 70/302* (2021.05); *B29C 70/38* (2013.01); *B29C 70/54* (2013.01); *B29L 2023/00* (2013.01); *B29L 2031/3076* (2013.01); *B29L 2031/7504* (2013.01)

(56)                     References Cited

U.S. PATENT DOCUMENTS

| | | | |
|---|---|---|---|
| 11,667,089 B2 * | 6/2023 | Bouchy ................... | B29B 11/16 264/294 |
| 2020/0180238 A1 | 6/2020 | Desjoyeaux et al. | |
| 2025/0256431 A1 * | 8/2025 | Wlasow Wlasowski ................... | B29C 70/382 |

* cited by examiner

[Fig. 1]
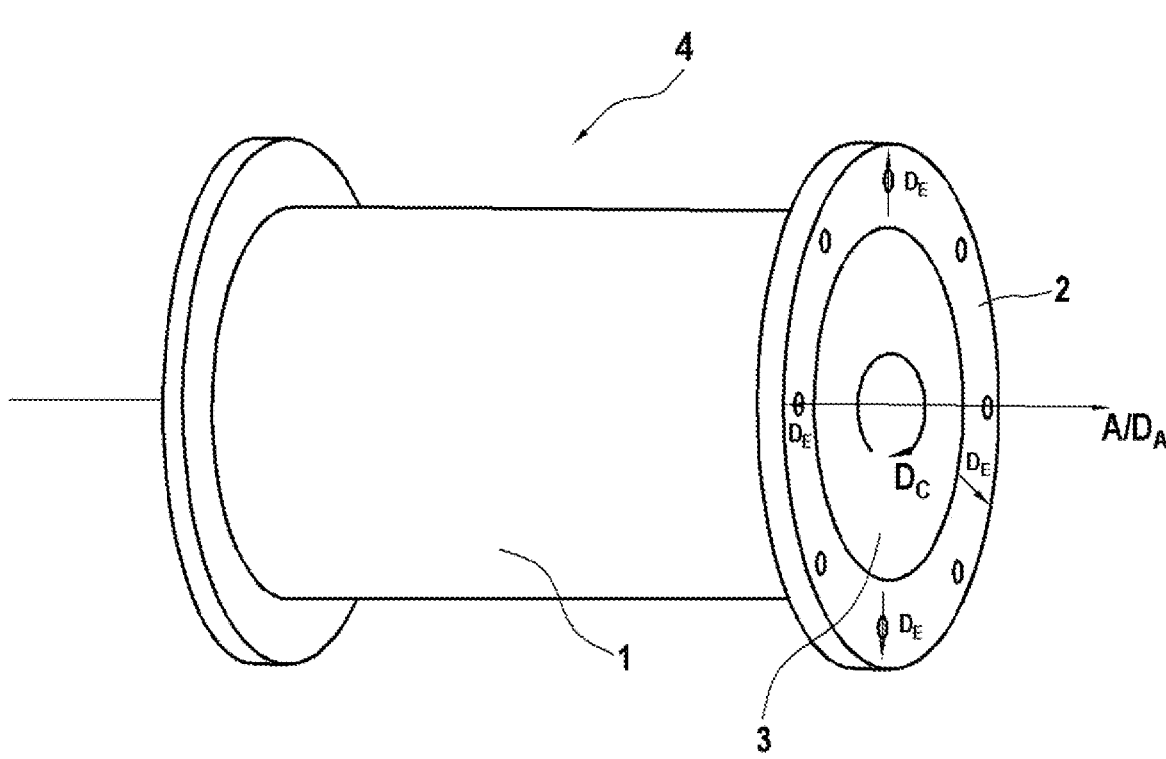

[Fig.2]
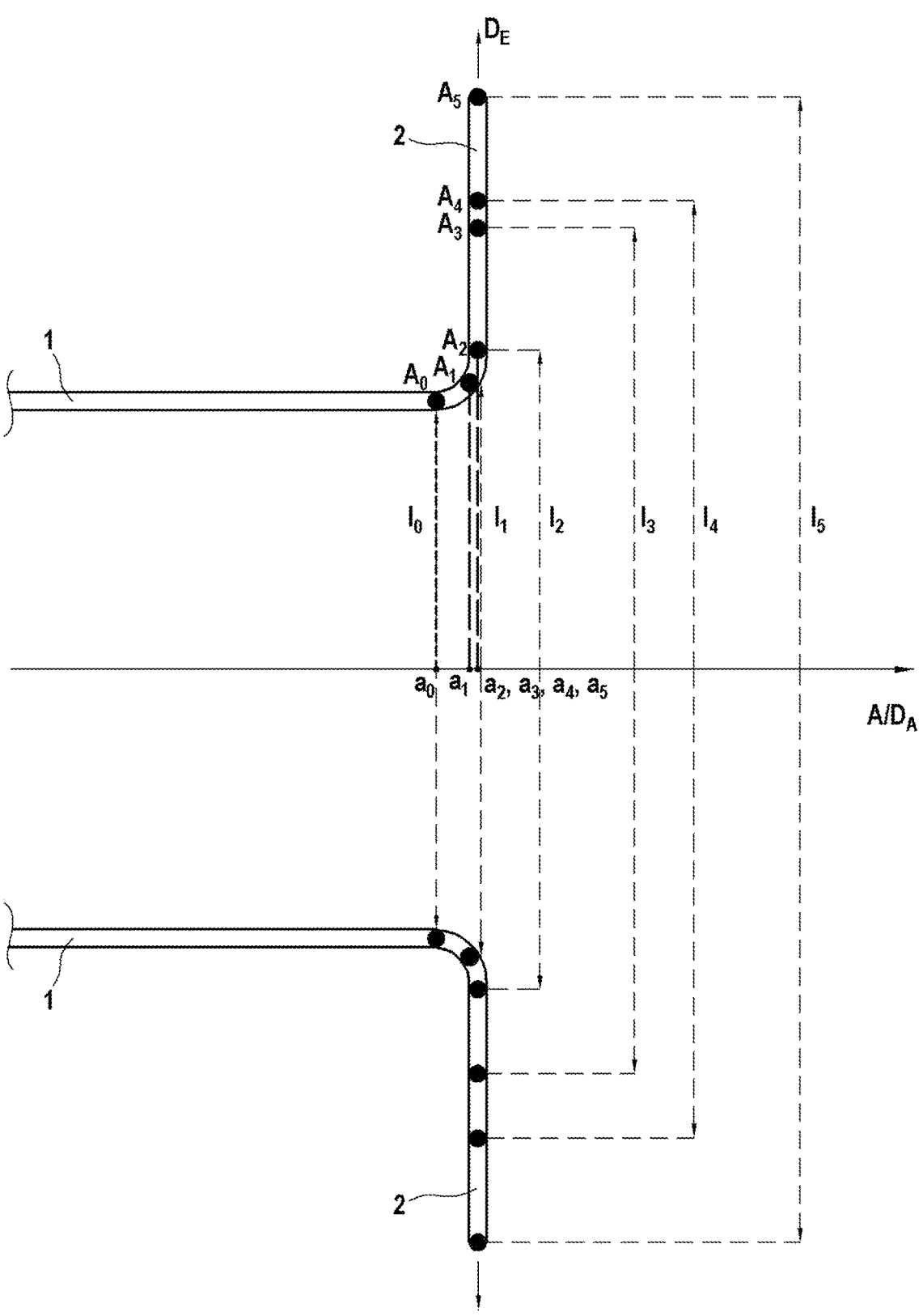

[Fig.3]
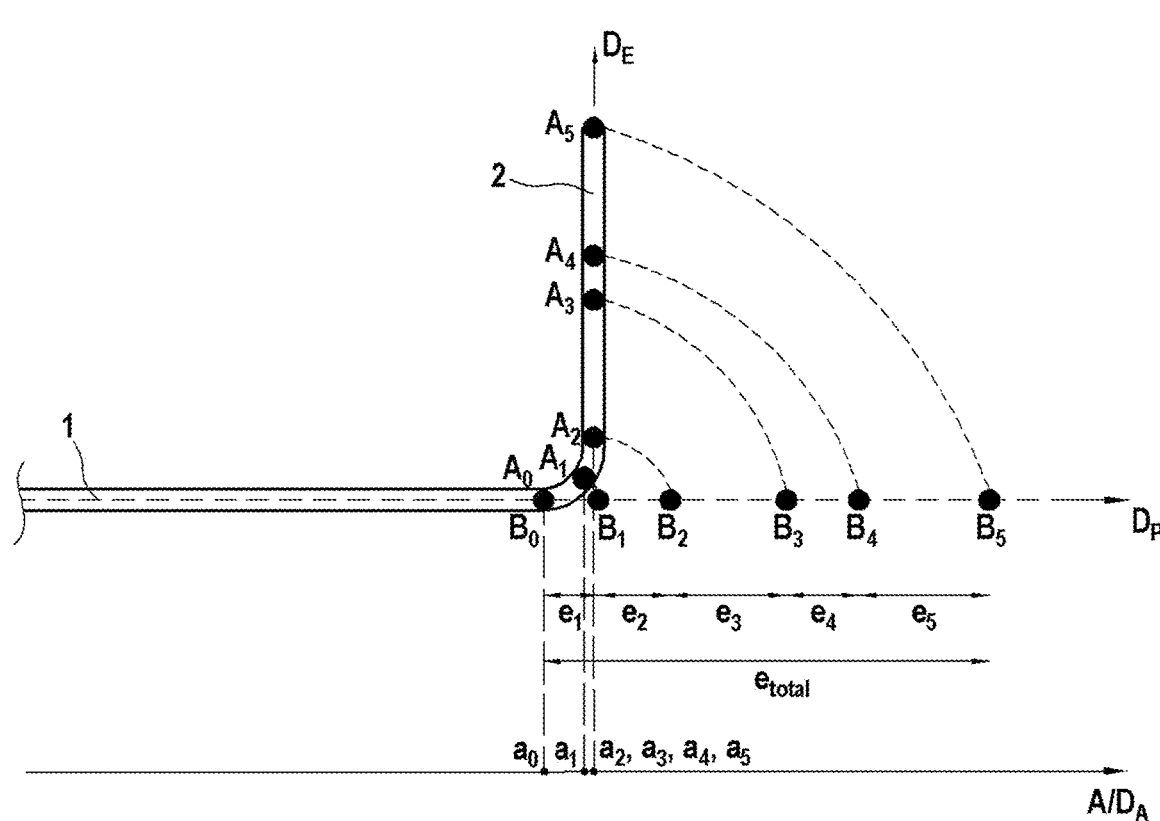

[Fig.4]
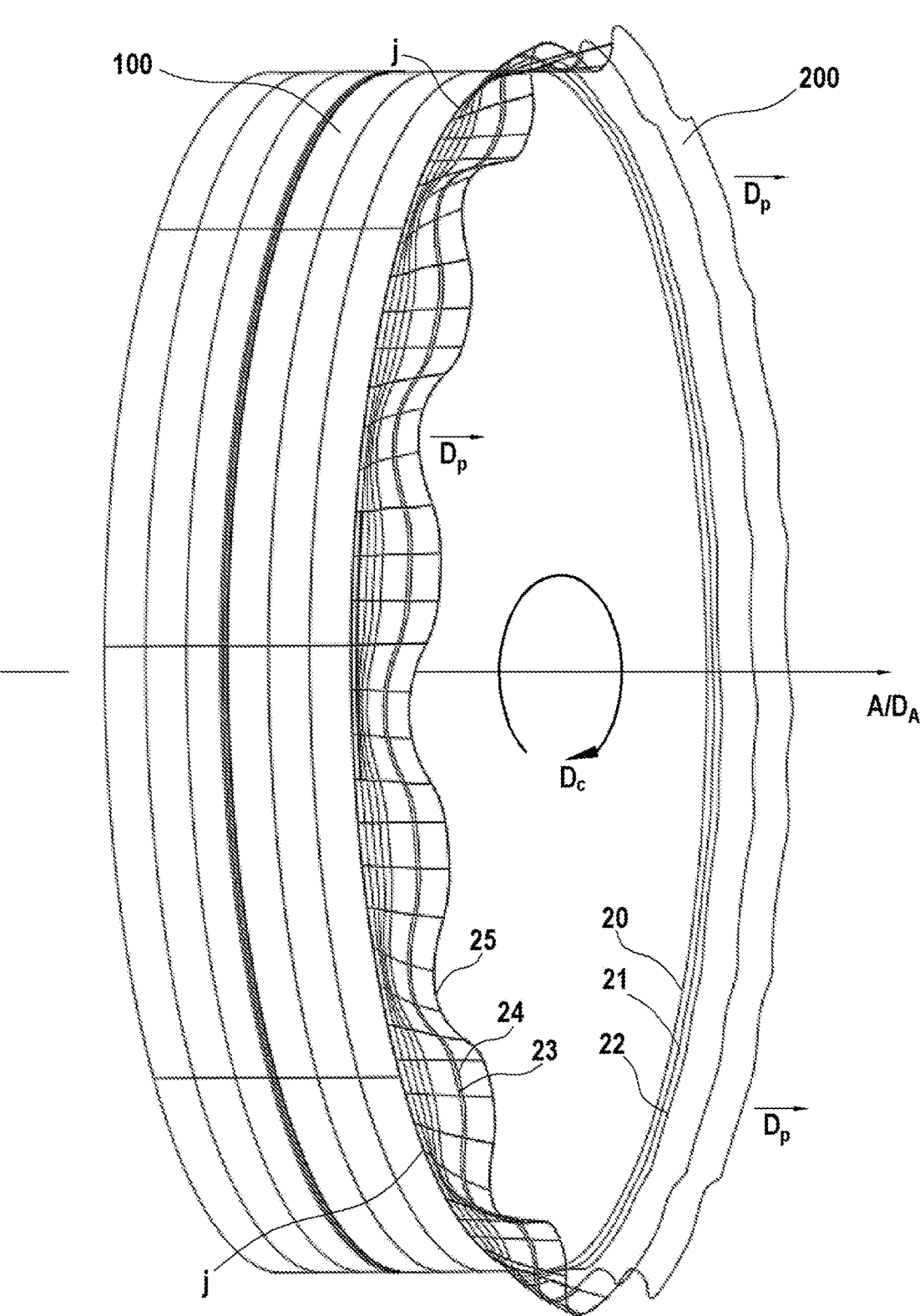

[Fig.5]
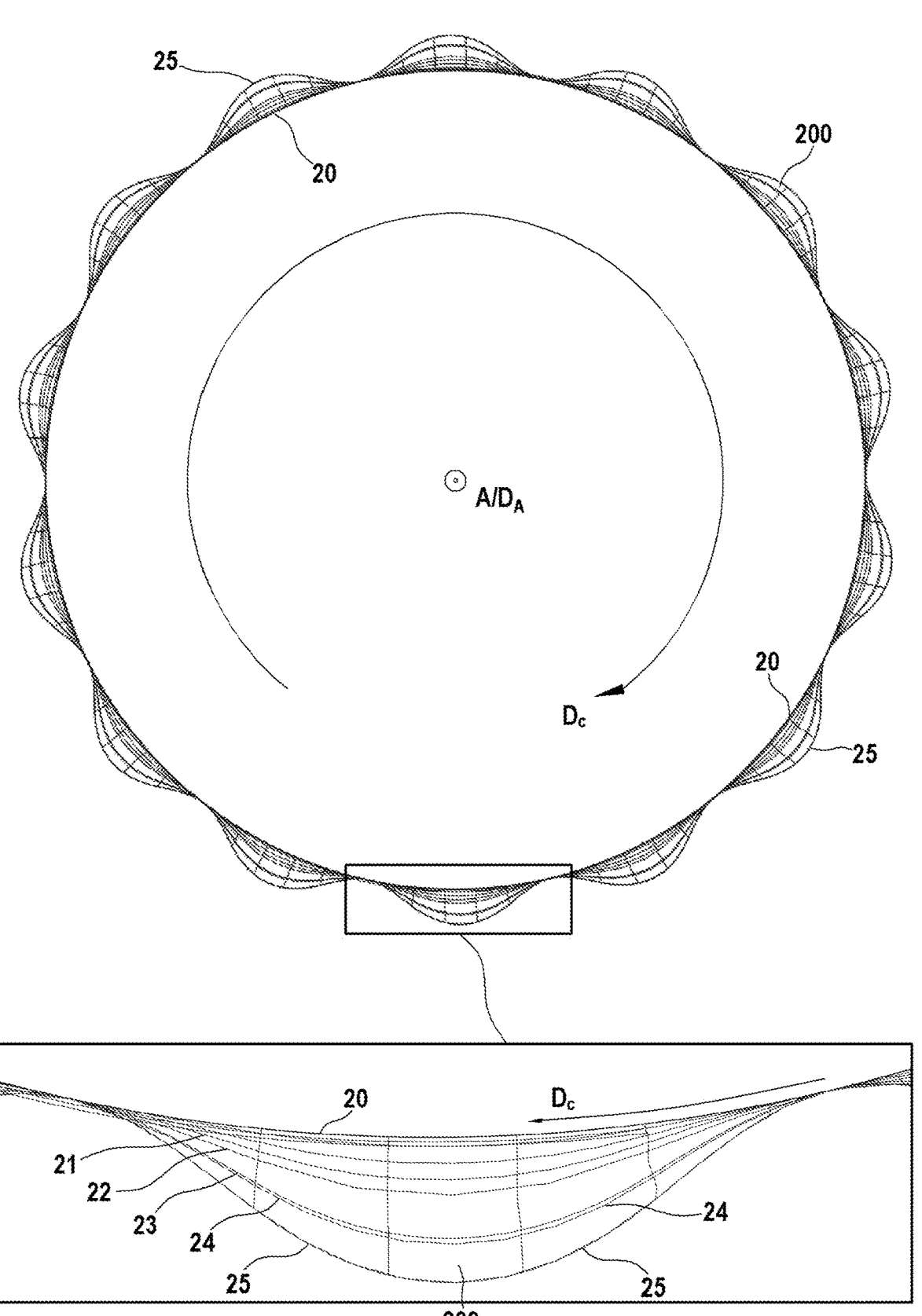

[Fig.6]
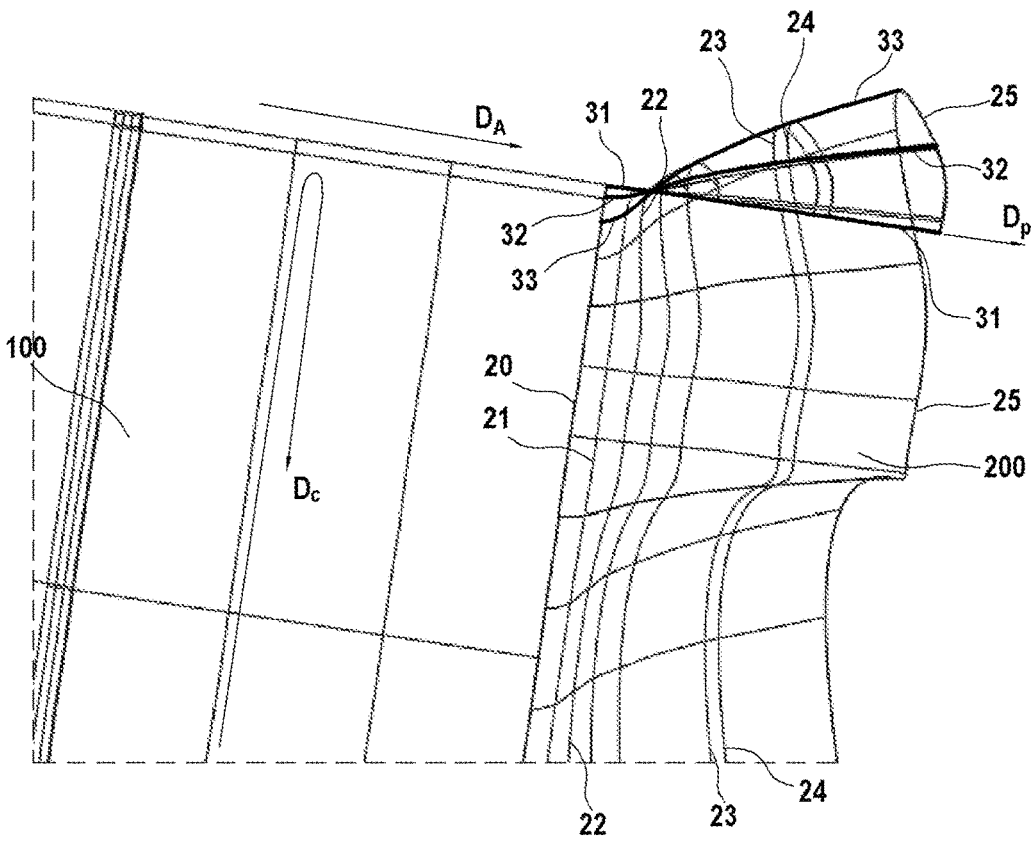
[Fig.7]
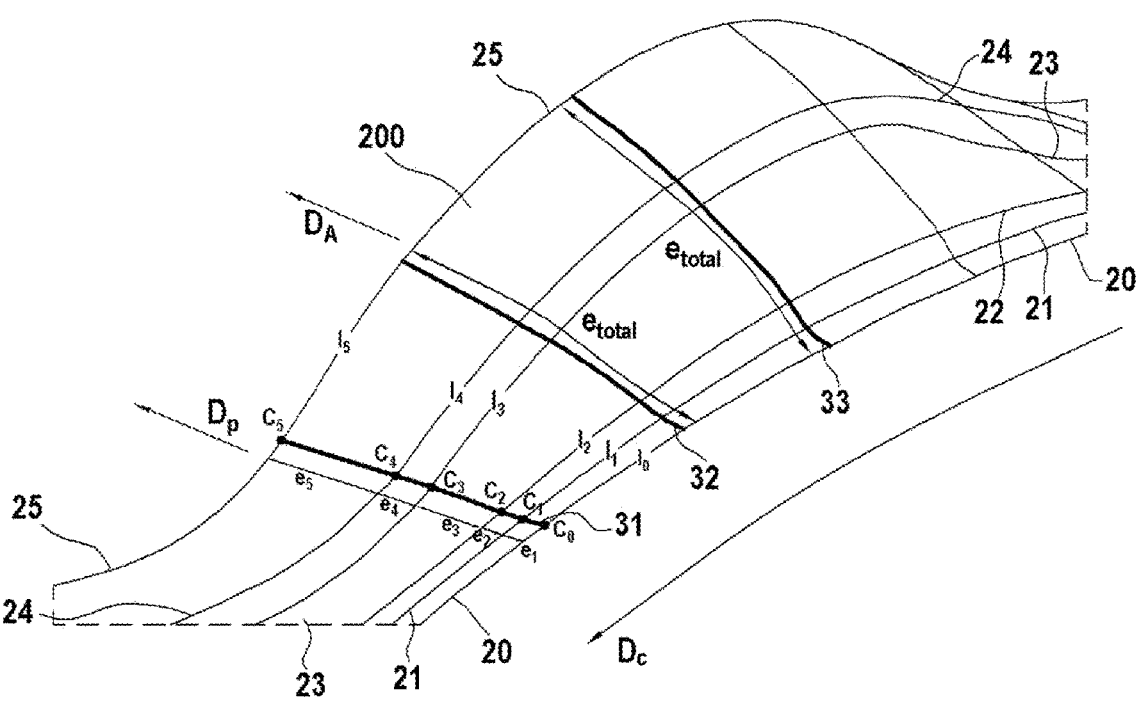

[Fig. 8]
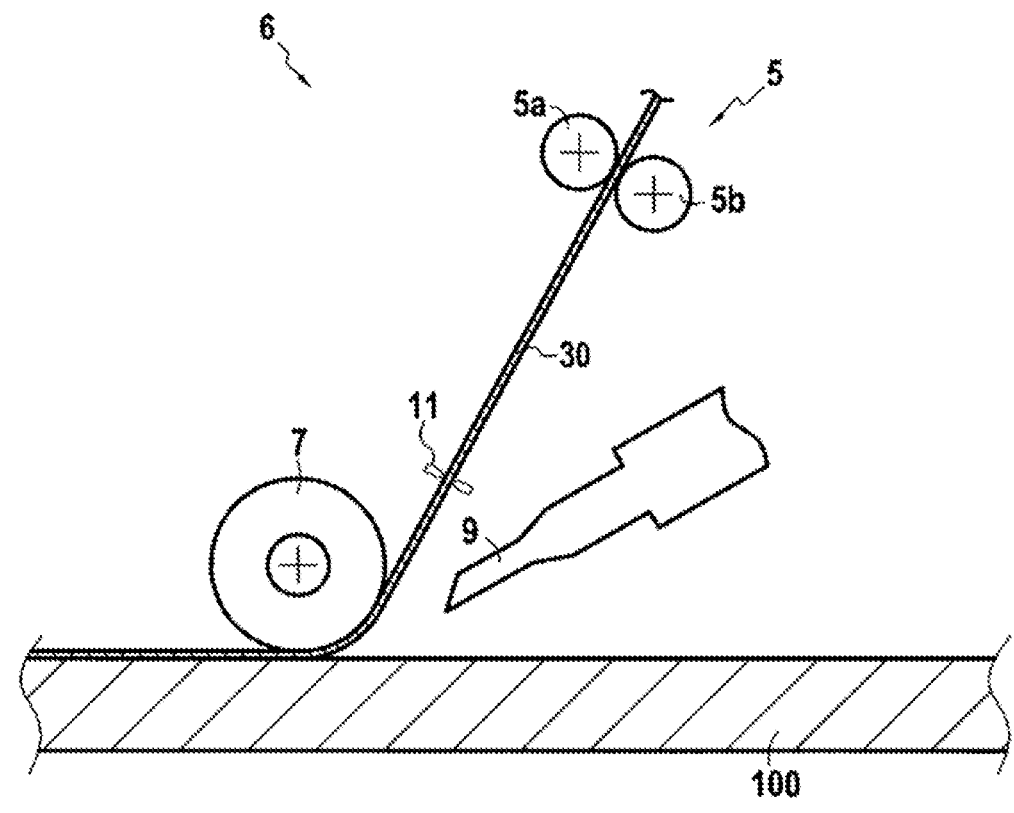

[Fig. 9]
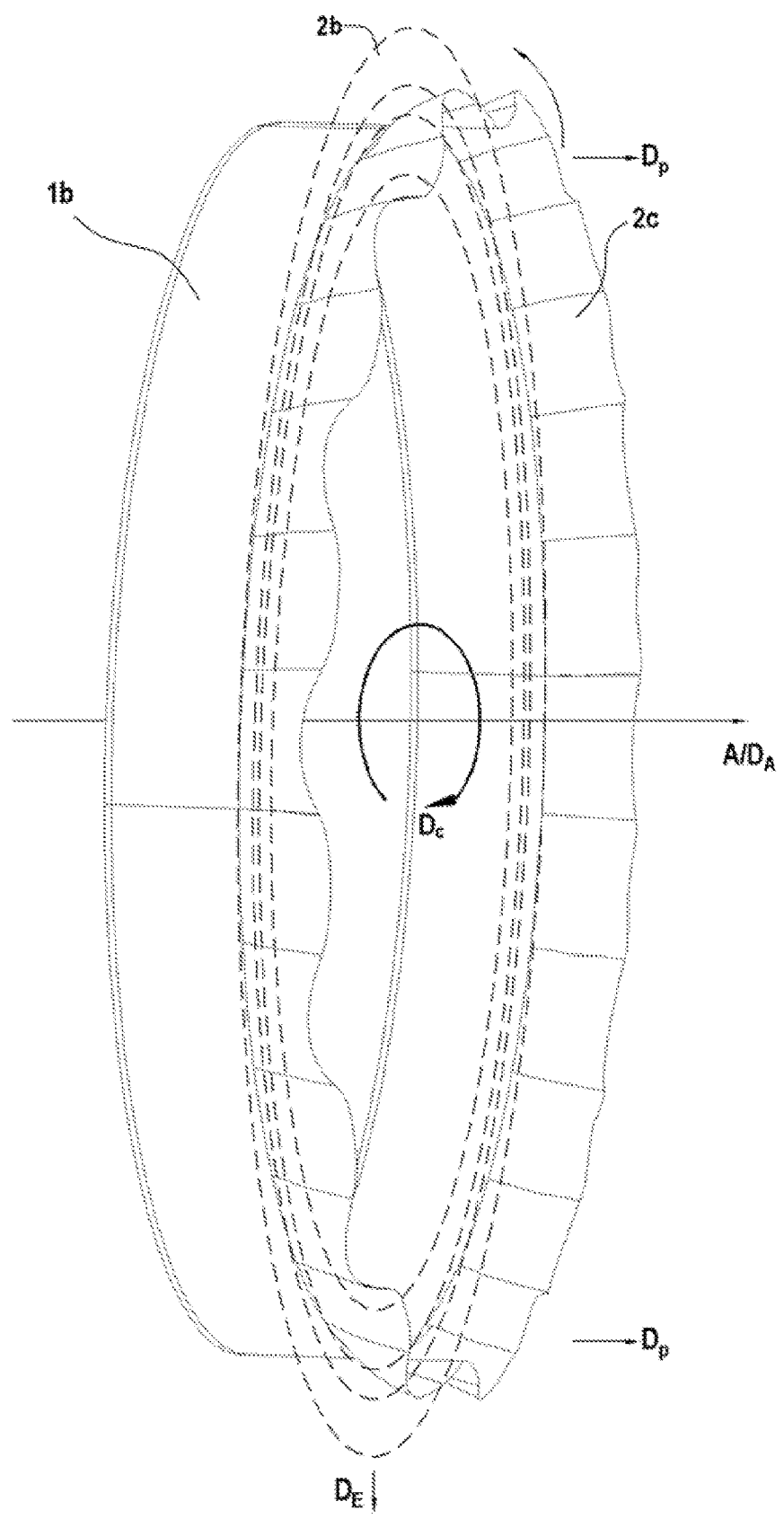

GEOMETRY OF A LAYUP SURFACE

CROSS-REFERENCE TO RELATED APPLICATIONS

This application is the U.S. National Stage of PCT/EP2022/075556, filed Sep. 14, 2022, which in turn claims priority to Belgian patent application number 2021/5753 filed Sep. 24, 2021. The content of these applications are incorporated herein by reference in their entireties.

TECHNICAL FIELD

The invention relates to the manufacture of components made of composite material by lay-up on a surface. In particular, but not exclusively, the invention relates to the manufacture of housings for aeronautical engines.

PRIOR ART

The use of composite materials for manufacturing aeronautical components, for example for aeronautical engine housings, enables components to be obtained which are strong and have mechanical performances equivalent to, or even superior to, those made from metal, while having a much lower mass.

It is known to produce components made of composite material by lay-up on a surface of pre-impregnated fibrous structures. For reasons of production costs and repeatability, the lay-up can be carried out automatically, using the automated fibre placement (AFP) technique. An example of a method for manufacturing a composite material component using the AFP method is described, for example, in document FR3062336B1.

However, in the case of components having convex surfaces with small amplitude angles, for example 120° or less, the head or roller for depositing the fibrous structures cannot access the bottom of said angles. This is the case, for example, for components comprising one or more flanges extending from the body of the component.

Hence, in order to produce components having such angles, the lay-up is produced with larger amplitude angles in order to allow the passage of the deposition head or roller, then the structure produced by lay-up is mechanically deformed in order to obtain the desired angles. Such a solution is described, for example, in document WO2012/046020. In said document, a component is produced comprising a cylindrical body and a circular flange extending perpendicular to the cylindrical body. The lay-up is produced by laying-up the portion intended to form the flange in the prolongation of the lay-up of the portion intended to form the cylindrical body. Then, the portion intended to form the flange is deformed in order to place it perpendicular to the axis of revolution of the body. The portion intended to form the flange during laying-up has circumferential undulations having greater amplitude as the free end of the first portion is approached, so as to obtain a smooth flange after deformation.

However, the mechanical deformation of the layed-up structure causes deformations of the layed-up fibrous structures and significant stresses in the fibres, in particular close to the apex of the angle. These deformations are even more accentuated when a fillet is present between the flange and the body.

DISCLOSURE OF THE INVENTION

The aim of the present invention is to remedy the abovementioned disadvantages. For this purpose, the present invention proposes a method for determining a geometry of a lay-up mould for producing a blank of a composite material component, comprising a body of revolution of axis directed in an axial direction, said body extending around the axial direction in a circumferential direction, and at least one flange extending from one end of the body in a direction of extension, the method comprising:

determining a first surface of revolution of axis directed in the axial direction, having the shape of the body to be produced, said first surface extending around the axial direction in the circumferential direction, determining a second surface situated in the prolongation of the first surface in a prolongation direction, the angle formed between the axial direction and the prolongation direction being greater than the angle formed between the axial direction (DA) and the direction of extension, the second surface having closed curves of undulation in the circumferential direction continuing successively in the prolongation direction, each closed curve of circumferential undulation corresponding to a circle belonging to the flange to be produced, the curvilinear length of said closed curve corresponding to the value of the perimeter of said circle, the method being characterised in that the second surface also has corrective curvatures in the prolongation direction, such that all the points of each closed curve of circumferential undulation are at a same curvilinear distance from the junction between the first surface and the second surface, said curvilinear distance belonging to the second surface and having a value corresponding to the curvilinear distance between the circle belonging to the flange to be produced corresponding to said closed curve, and the junction between the flange and the body to be produced.

The term "body of revolution" shall be understood as a body having the shape of a complete volume of revolution, or of at least one portion of a complete volume of revolution.

The curvilinear distance between a point of a closed curve and the junction between the first surface and the second surface is defined as the shortest curvilinear distance belonging to the second surface and enabling said point of the closed curve to join to said junction.

The curvilinear distance between a circle and the junction between the flange and the body is defined as the shortest curvilinear distance belonging to the flange and enabling a point of the circle to join to said junction.

Hence, by producing corrective curvatures in the prolongation direction, the stresses in the fibres following the deformation are limited. More specifically, the circumferential undulations generate shortages of length in the direction of extension, which are rectified using corrective curvatures.

In addition, the determining of different curvilinear lengths between the circles belonging to the flange and the junction between the flange and the body makes it possible to take into account the radius of any potential fillet between said flange and said body when designing the mould. Hence, the tensions in the fibres are limited at the location of said fillet.

According to a particular feature of the invention, the points of inflection of each closed curve of circumferential undulation are on a same circle.

According to another particular feature of the invention, the minima of each closed curve of circumferential undulation are on a same circle, the radius of which is greater than or equal to the radius of the circle producing the junction between the first surface and the second surface.

According to another particular feature of the invention, the minima of each closed curve of circumferential undulation are on a same circle, the radius of which is identical to the circle producing the junction between the first surface and the second surface.

Hence, it is ensured that the minimum possible stress is obtained in the fibres during the deformation of the fibrous blank.

According to another particular feature of the invention, the corrective curvatures situated on the maxima of the circumferential undulations have larger radii of curvature than the corrective curvatures situated on the points of inflection of the circumferential undulations.

More specifically, the circumferential undulations deform the second surface and can therefore cause shortages of material on the maxima of the circumferential undulations. Hence, by using more-curved corrective curvatures on the maxima of the circumferential undulations, more material can be added at these locations.

According to another particular feature of the invention, the angle between the axial direction and the direction of extension is less than or equal to 120° and the angle between the axial direction and the prolongation direction is greater than 120°. According to another particular feature of the invention, the flange to be produced comprises a fillet at its junction with the body to be produced.

The invention further relates to a method for manufacturing a composite material component comprising a body of revolution with axis directed in an axial direction, said body extending around the axial direction in a circumferential direction, and at least one flange extending from one end of the body in a direction of extension, the method comprising:

producing a lay-up mould comprising a first lay-up surface and a second lay-up surface, the first lay-up surface and the second lay-up surface respectively corresponding to at least one portion of the first surface and of the second surface determined according to the method for determining a lay-up mould geometry according to the invention, forming a fibrous blank of the component to be obtained by depositing a plurality of fibrous layers on the lay-up mould comprising the first lay-up surface and the second lay-up surface, the deposition being performed by automated fibre placement, shaping a portion of the fibrous blank formed on the second lay-up surface in the direction of extension so as to obtain a fibrous preform having the shape of the body and of the flange to be produced, and densification of the preform by a matrix in such a way as to obtain the composite material component.

Hence, even if the first and second "geometric" surfaces, determined by the method for determining the geometry of the mould are defined over 360°, the first and second "actual" lay-up surfaces can extend circumferentially over a shorter distance, for example only over 180° or over 120°, according to the composite material component to be produced.

The invention further relates to a mould for the lay-up of fibrous structures comprising a first lay-up surface and a second lay-up surface extending in the prolongation of the first lay-up surface in a prolongation direction, the first lay-up surface being a surface of revolution of axis directed in an axial direction, said first lay-up surface extending around the axial direction in a circumferential direction, the mould being characterised in that the second lay-up surface has undulations in the circumferential direction and corrective curvatures in the prolongation direction.

The term "surface of revolution" shall be understood as a surface having the shape of a complete surface of revolution, or of at least one portion of a complete surface of revolution.

According to a particular feature of the invention, the mould comprises a plurality of separable parts delimited so as to allow demoulding after the lay-up.

BRIEF DESCRIPTION OF THE FIGURES

FIG. 1 is a three-dimensional view of a component that can be produced by using a lay-up mould according to the invention, comprising a body and at least one flange.

FIG. 2 is a schematic partial sectional view of the component of the FIG. 1 for determining the perimeters of circles belonging to the flange.

FIG. 3 is a partial sectional view of the component of the FIG. 1 for determining lengths of the flange.

FIG. 4 is a three-dimensional view of a mould according to the invention, for producing the component of FIG. 1 on which geometric elements are superimposed.

FIG. 5 is a view of the mould illustrated in FIG. 4, illustrating circumferential undulations.

FIG. 6 is a first partial three-dimensional view of the mould illustrated in FIG. 4 illustrating the corrective curvatures.

FIG. 7 is a second partial three-dimensional view of the mould illustrated in FIG. 4, illustrating the corrective curvatures.

FIG. 8 is a partial schematic illustration of the formation of an assembly layed-up by automated fibre placement.

FIG. 9 is a three-dimensional view of a fibrous blank produced by lay-up on the mould illustrated in FIGS. 4 to 7.

DESCRIPTION OF THE EMBODIMENTS

FIG. 1 illustrates a component 4 made of composite material comprising a body 1 and at least one flange 2. The term "flange" can designate a collar. The component 4 may be an aeronautical engine housing comprising two flanges. The body 1 is a volume of revolution, of which the axis of revolution A is directed in an axial direction $D_A$. The body 1 must comprise at least one circular opening 3, the centre of which lies on the axis of revolution A of said body 1. The body 1 extends around its axis of revolution A in a circumferential direction $D_C$. The circumferential direction $D_C$ extends circularly in a plane perpendicular to the axial direction $D_A$.

In the example illustrated in FIG. 1, the body 1 is cylindrical. Of course, it does not go beyond the scope of the invention if the body is another volume of revolution comprising a circular opening, for example if the body has a frustoconical or tubular shape, or even any axisymmetric profile. It does not go beyond the scope of the invention either if the body is an incomplete volume of revolution, in other words if its shape only corresponds to a portion of a volume of revolution, such as a half-cylinder for example.

The flange 2 is present at one end of the body 1 comprising a circular opening 3, and extends from the circular opening 3 of the body 1. The flange 2 has an annular or frustoconical shape with axis of revolution A directed in the axial direction $D_A$. The flange 2 extends from the body 1 in a direction of extension $D_E$.

Hence, the entire component 4 made of composite material is a volume of revolution of axis A directed in the axial direction $D_A$. The direction of extension $D_E$ is defined for each point from the junction between the body 1 and the flange 2. The directions of extension $D_E$ at two different points of said junction can be differently oriented. However, the directions of extension $D_E$ defined for each point of the junction between the body 1 and the flange 2 must intersect at a single point lying on the axis of revolution A of the component 4.

In the example illustrated in FIG. 1, the flange 2 forms an angle of 90° with the body 1 from which it extends, which corresponds to a direction of extension $D_E$ perpendicular to the axial direction $D_A$. Of course, it does not go beyond the scope of the invention if the flange forms an angle less than 90° with the body, which corresponds to an angle less than 90° between the direction of extension and the axial direction. It does not go beyond the scope of the invention either if the flange forms an angle greater than 90° with the body, if this angle is sufficiently small to cause collision problems during the automated lay-up of said angle. Typically, the present invention can have a particular advantage when the flange forms an angle less than or equal to 120° with the body from which it extends, which corresponds to an angle less than or equal to 120° between the direction of extension and the axial direction.

It is desired to produce the component 4 made of composite material illustrated in FIG. 1 by lay-up of fibrous structures on a surface, according to the well-known method of automated fibre placement (AFP). However, the reduced angle formed between the flange 2 and the body 1 of the component 4 does not enable a lay-up to be produced directly on a surface having the shape of the final component 4. More specifically, this angle does not allow the complete passage of an automated deposition head or roller, and causes an unsatisfactory deposition of the fibrous structures at the bottom of the angle.

Consequently, the invention proposes designing a particular lay-up geometry having a large angle, or even flat, between the layed-up portion intended to form the body 1 and the layed-up portion intended to form the flange 2, in order to be able to proceed to the automated lay-up of fibrous structures. Once the lay-up is achieved, the layed-up portion intended to form the flange 2 is deformed so as to form the desired angle between the flange 2 and the body 1.

In order to enable the deformation of the layed-up assembly at the correct angle without causing the creation of significant tensions in the layed-up assembly, and more particularly close to the apex of the angle between the flange 2 and the body 1, it is necessary to design a particular geometry for the lay-up mould of the portion intended to form the flange 2.

For simplification of the figures and description, the first "geometric" surface determined according to the method for determining a lay-up geometry of the invention and the first "actual" lay-up surface of the mould are identical and combined to bear the same reference sign "100". Similarly, the second "geometric" surface determined according to the method for determining a lay-up geometry of the invention and the second "actual" lay-up surface of the mould are identical and combined to bear the same reference sign "200". Of course, it does not go beyond the scope of the invention if the first and second "actual" lay-up surfaces only correspond to a portion of the determined first and second "geometric" surfaces.

The mould must comprise a first lay-up surface 100, enabling the portion intended to form the body 1 to be layed-up, and a second lay-up surface 200, enabling the portion intended to form the flange 2 to be layed-up, as illustrated in FIGS. 4 to 7. The first surface 100 of the mould is conventionally designed to correspond to the inner surface of the body 1 to be manufactured. Consequently, the first surface 100 is a surface of revolution of axis A directed in the axial direction $D_A$, said first surface 100 extending around the axial direction $D_A$ in the circumferential direction $D_C$. In the present example, the first surface 100 is thus cylindrical in order to allow the manufacture of the body 1 illustrated in FIG. 1.

The second surface 200 of the mould extends in the prolongation of the first surface 100 of the mould, in a prolongation direction $D_P$.

Preferably, at any point of the junction between the first surface and the second surface, the tangent of the first surface coincides with the tangent of the second surface. In the case of a first cylindrical surface, as in the present example, this amounts to the prolongation direction at any point of the junction between the first surface and the second surface being oriented in the axial direction.

Of course, it does not go beyond the scope of the invention if, at any point of the junction between the first surface and the second surface, the tangent of the first surface is slightly inclined with respect to the tangent of the second surface, provided that the junction between the first surface and the second surface is easily accessible for a head or a roller for automated depositing of fibrous structures. Hence, at any point of the junction between the first surface and the second surface, the angle between the tangent of the first surface and the tangent of the second surface is typically greater than or equal to 120°, and preferably equal to 180°.

The second surface 200 of the mould is designed in several steps. The first step consists in determining the perimeter of one or more circles belonging to the flange, said circles lying in a plane perpendicular to the axial direction and having as their centre, a point lying on the axis of revolution, depending on their distance relative to the axis of revolution and the position of their centre on the axis of revolution.

In the case where a sharp edge embodies the junction between the flange and the body, and where the direction of extension is perpendicular to the axial direction, all the circles belonging to the flange are situated in the same plane. Hence, in this particular configuration, the position of the centre of the circles on the axis of revolution is identical for each of the circles belonging to the flange.

In the case where a fillet embodies the junction between the flange and the body, or in the case where the direction of extension is not perpendicular to the axial direction, it is necessary to take into account the position of the centre of the circles belonging to the flange on the axis of revolution. It is considered that the fillet which embodies the junction between the flange and the body forms part of the flange.

In the present example, it is necessary to take into account the fillet between the body 1 and the flange 2. Hence, it is therefore necessary to determine the perimeter of circles belonging to the fillet of the flange 2 and circles belonging to the part of the flange 2 extending in the direction of extension $D_E$.

Several points $A_0$, $A_1$, $A_2$, $A_3$, $A_4$, $A_5$ can be chosen, belonging to the flange 2 and disposed at different distances from the axis of revolution A of the component 4, as illustrated in FIG. 2. The points chosen $A_0$, $A_1$, $A_2$, $A_3$, $A_4$, As preferably comprise a point $A_0$ belonging to the junction between the body 1 and the flange 2 and a point $A_5$ belonging to the end of the flange 2. Since a fillet is present, it is necessary to discretise the fillet. Hence, the chosen points $A_0$, $A_1$, $A_2$, $A_3$, $A_4$, $A_5$ preferably comprise a point $A_1$ belonging to the fillet and a point $A_2$ present at the end of the fillet opposite the junction between the flange 2 and the body 1. Of course, it does not go beyond the scope of the invention if more or fewer points are chosen, or if their placing is different.

Each of the points $A_0$, $A_1$, $A_2$, $A_3$, $A_4$, $A_5$ is respectively associated with a position $a_0$, $a_1$, $a_2$, $a_3$, $a_4$, $a_5$ on the axis of revolution A of the component 4, as illustrated in FIG. 2. Each of the points $A_0$, $A_1$, $A_2$, $A_3$, $A_4$, $A_5$ is also associated with a circle comprising said point, for which the centre lies on the axis of revolution A. Hence, each of the points $A_0$, $A_1$, $A_2$, $A_3$, $A_4$, As is respectively associated with a circle for which the centre has position $a_0$, $a_1$, $a_2$, $a_3$, $a_4$, $a_5$. Each circle associated with a point $A_0$, $A_1$, $A_2$, $A_3$, $A_4$, As respectively has a perimeter of length $l_0$, $l_1$, $l_2$, $l_3$, $l_4$, $l_5$.

The second step consists in determining one or more curvilinear lengths from the junction between the flange and the body to one or more of the circles belonging to the flange, said circles lying in a plane perpendicular to the axial direction and having for centre a point lying on the axis of revolution, depending on their distance relative to the axis of revolution and the position of their centre on the axis of revolution.

In the case where a sharp edge embodies the junction between the flange and the body, the curvilinear lengths to be determined between the junction and the circles belonging to the flange are rectilinear lengths extending in the direction of extension $D_E$. Hence, in this configuration, the lengths from the junction are easy to determine.

In the case where a fillet embodies the junction between the flange and the body, the curvilinear lengths to be determined between the junction and the circles belonging to the flange are not rectilinear.

In the present example, it is necessary to take into account the fillet between the body 1 and the flange 2. Hence, it is necessary to determine the curvilinear lengths between the junction and the circles belonging to the flange 2.

The points $A_0$, $A_1$, $A_2$, $A_3$, $A_4$, $A_5$ for which the associated perimeter lengths $l_0$, $l_1$, $l_2$, $l_3$, $l_4$, $l_5$ are known are taken. By plotting the curvilinear lengths between the points $A_0$, $A_1$, $A_2$, $A_3$, $A_4$, $A_5$ over the prolongation direction $D_P$, as illustrated in FIG. 3, a set is obtained corresponding to points $B_0$, $B_1$, $B_2$, $B_3$, $B_4$, $B_5$ separated by the curvilinear lengths $e_1$, $e_2$, $e_3$, $e_4$, $e_5$. Hence, the curvilinear length from the junction to the circle corresponding to the point $A_4$ will be the sum of the lengths $e_1$, $e_2$ and $e_3$. The total curvilinear length $e_{total}$ of the flange 2 from the junction to its end will therefore be the length between $B_0$ and $B_5$, i.e. the sum of the lengths $e_1$, $e_2$, $e_3$, $e_4$ and $e_5$, as illustrated in FIG. 3.

Consequently, each perimeter length $l_0$, $l_1$, $l_2$, $l_3$, $l_4$, $l_5$ is associated with a curvilinear length defined from the junction, respectively having a value of 0, $e_1$, $e_1+e_2$, $e_1+e_2+e_3$, $e_1+e_2+e_3+e_4$, $e_{total}$.

In general, the first step and the second step can be performed simultaneously, or one after the other in any order. At the end of the first two steps, each curvilinear length starting from the junction, is associated with a perimeter length.

The third step consists in determining the geometry of the second surface 200 of the mould, which extends in the prolongation of the first surface 100 of the mould in the prolongation direction $D_P$.

As illustrated in FIG. 5, the second surface 200 is designed so as to have undulations in the circumferential direction $D_C$. Hence, the second surface 200 has a plurality of closed curves 21, 22, 23, 24, 25 of circumferential undulation following one another in the axial direction $D_A$. A closed curve comprises the set of points situated at a same curvilinear distance from the junction j between the first surface 100 and the second surface 200, said curvilinear distance belonging to the second surface 200.

The undulations of a same closed curve 21, 22, 23, 24, 25 have a regular period in the circumferential direction $D_C$. The undulations of the closed curves 21, 22, 23, 24, 25 are composed of a continuous alternation of concave and convex curves in the circumferential direction $D_C$. The undulations of the closed curves 21, 22, 23, 24, 25 are preferably periodic, and optionally sinusoidal, or overall sinusoidal, as illustrated in FIG. 5.

The undulations of a same closed curve 21, 22, 23, 24, 25 have a plurality of maxima and a plurality of minima, the plurality of maxima being distributed over a circle, the centre of which lies on the axis of revolution A of the first surface 100, and the plurality of minima being distributed over a circle, the centre of which lies on the axis of revolution A of the first surface 100. Hence, the undulations of a same closed curve 21, 22, 23, 24, 25 have a constant amplitude in the circumferential direction $D_C$. The minima are defined as the points of the closed curves 21, 22, 23, 24, 25 closest to the axis of revolution A, and the maxima are defined as the points of the closed curves 21, 22, 23, 24, 25 furthest away from the axis of revolution A.

The points of inflection of a same closed curve 21, 22, 23, 24, 25 of undulation are distributed over a circle, the centre of which lies on the axis of revolution of the first surface.

The amplitude and number of undulations of the closed curves 21, 22, 23, 24, 25 are chosen so as to allow the passage of the head for automated deposition of fibre at any point of the second surface 200. Hence, the amplitude must not be too high, in order to allow the passage of said head, or to be able to deposit a plurality of rovings at the same time.

In the example illustrated in FIGS. 4 to 7, the minima of all the closed curves of circumferential undulation are distributed over circles of identical radius, and of the same radius as the circle 20 forming the junction j between the first surface 100 and the second surface 200. Of course, it does not go beyond the scope of the invention if the minima of all the closed curves of circumferential undulation are distributed over circles with identical radii, but of radius greater than the radius of the circle forming the junction between the first surface and the second surface. It does not go beyond the scope of the invention either if the minima of each closed curve of circumferential undulation are distributed over circles of different radii, provided that said radii are greater than the radius of the circle forming the junction between the first surface and the second surface.

It does not go beyond the scope of the invention either if these are the points of inflection of all the closed curves of circumferential undulation which are distributed over circles with identical radii, and of the same radius as the circle forming the junction between the first surface and the second surface.

The further away from the junction j between the first surface 100 and the second surface 200 in the axial direction $D_A$, the more the closed curves 21, 22, 23, 24, 25 of circumferential undulation progressively have a large amplitude, as illustrated in FIGS. 4 to 7.

The curvilinear length of each of the closed curves 21, 22, 23, 24, 25 of circumferential undulation depends on the curvilinear distance of said closed curve 21, 22, 23, 24, 25 relative to the junction j between the first surface 100 and the second surface 200. Using the pairs of perimeter/curvilinear length defined from the junction $(l_1; e_1)$, $(l_2; e_1+e_2)$, $(l_3; e_1+e_2+e_3)$, $(l_4; e_1+e_2+e_3+e_4)$, $(l_5; e_{total})$ determined at the end of the first and second steps, it is obtained that the curvilinear length of a closed curve 21, 22, 23, 24, 25 of circumferential undulation situated at a given curvilinear distance from the junction j is the perimeter length $l_1$, $l_2$, $l_3$, $l_4$, $l_5$ previously associated with said curvilinear distance $e_1$, $e_1+e_2$, $e_1+e_2+e_3$, $e_1+e_2+e_3+e_4$, $e_{total}$ defined from junction j.

Hence, the closed curves 21, 22, 23, 24, 25 of circumferential undulation respectively have a curvilinear length $l_1$, $l_2$, $l_3$, $l_4$, $l_5$ when they are far away from the junction j, respectively of a curvilinear distance $e_1$, $e_1+e_2$, $e_1+e_2+e_3$, $e_1+e_2+e_3+e_4$, $e_{total}$.

As illustrated in FIGS. 6 and 7, the second surface 200 is designed so as to have curvatures 32, 33 in the prolongation direction $D_P$. Hence, the distances $e_1$, $e_2$, $e_3$, $e_4$, $e_{total}$ cannot be rectilinear along their position on the second surface 200. These so-called "corrective" curvatures 32, 33, are necessary in order to limit the stresses during the deformation of the layed-up assembly, mainly at the junction between the body and the flange. More specifically, if the distances $e_1$, $e_2$, $e_3$, $e_4$, $e_{total}$ were rectilinear, as is the case the prior art, the distance between the junction j and the end of the second surface 200 would vary according to its position relative to the circumferential undulations.

For example, if the minima of all the closed curves of circumferential undulation are distributed over circles of the same radius as the circle 20 forming the junction j between the first surface 100 and the second surface 200, as in the present example (see FIG. 5), the rectilinear distance between the junction j and the end of the second surface 200 would be shorter in the hollows of the circumferential undulations and longer on the bulge of the circumferential undulations. Hence, at the time of the deformation of the layed-up assembly, there is a lack of length in the direction of extension $D_E$ at a plurality of locations on the flange 2, which could create stresses in the composite material of the component 4.

The corrective curvatures 32, 33 presented by the second surface 200 in the prolongation direction $D_P$ have at least one point of inflection, as illustrated in FIG. 6. The corrective curvatures 32, 33 presented by the second surface 200 in the prolongation direction $D_P$ can be portions of an undulation curve, oscillating between a maximum and a minimum.

The second surface 200 can also comprise rectilinear lengths 31, which extend from the junction j to the end of the surface 200 in the prolongation direction $D_P$.

All the corrective curvatures 32, 33 and rectilinear lengths 31 of the second surface 200 directed along the prolongation direction $D_P$ have an identical curvilinear length, of value $e_{total}$ determined during the preceding steps, as illustrated in FIG. 7. In addition, the curvilinear distance travelled by a corrective curvature 32, 33 or by a rectilinear length 31 in the prolongation direction $D_P$ between the junction j and a closed curve 21, 22, 23, 24 or 25 of circumferential undulation will respectively have a value $e_1$, $e_1+e_2$, $e_1+e_2+e_3$, $e_1+e_2+e_3+e_4$, $e_{total}$.

Hence, a set of points $C_0$, $C_1$, $C_2$, $C_3$, $C_4$, $C_5$ is obtained, situated at the intersection between a rectilinear length 31 (or a corrective curvature 32, 33) and each of the closed curves 21, 22, 23, 24, 25 of circumferential undulation. When the portion layed-up on the second surface 200 will be deformed in the direction of extension $D_E$, each point of contact of a point $C_0$, $C_1$, $C_2$, $C_3$, $C_4$, $C_5$ will respectively be situated at the location of the point $A_0$, $A_1$, $A_2$, $A_3$, $A_4$, $A_5$ of the flange chosen during the first or second step.

Finally, the parameters of the circumferential undulations and the corrective curvatures 32, 33 of the second surface

200, such as the amplitude or the radii of curvature, are chosen so as allow the passage of the head for automated deposition of fibre at any point of the second surface 200.

The design of a lay-up geometry described above, makes it possible to produce a mould suitable for automated fibre lay-up (AFP). The mould can be produced by additive manufacturing, or by the usual manufacturing means, such as machining or casting. The mould can be in several separable parts rather than in one piece, in order to facilitate the one or more demoulding operations.

In conjunction with FIGS. 8 and 9, a method will now be described for manufacturing a composite material component comprising at least one lay-up step by automated fibre placement on a mould designed as described above.

FIG. 8 schematically illustrates the structure of a deposition head 1 of a device for implementing an AFP technique. The structure of the deposition head 1 is well known. The deposition head 1 is fed by a fibrous strip or roving 30.

The fibrous strip or roving 30 can be dry or impregnated. The fibrous strip or roving 30 can, for example, be impregnated by an aqueous suspension comprising matrix precursor particles, be impregnated by a thermosetting polymer or be impregnated by a thermoplastic polymer, as described in document FR3062336A$_1$.

The fibrous strip or roving 30 can be transported by a conveying element 5 to a pressure application element 7 situated on the side of the surfaces 100 and 200 of the lay-up mould. The conveying element 5 here is in the form of a pair of counter-rotating rollers 5a and 5b between which the strip or roving 30 is present. The conveying element 5 can advance the strip or roving 30 to the pressure application element 7. The pressure application element 7 applies a pressure on the strip or roving 30 in order to produce a deposit on the first and second surfaces 100 and 200 of the lay-up mould. The pressure application element 7 here is in the form of a roller.

The deposition head 1 can, moreover, include a heating element 9 situated in the vicinity of the pressure application element 7. This heating element 9 makes it possible, in the case of a strip or roving 30 impregnated by a thermoplastic or thermosetting, to heat the impregnated strip or roving 30 during its deposition in order to fluidise the polymer and thus give the deposited strip or roving 30 the ability to adhere.

During the deposition, the deposition head 1 is mobile in order to apply the strip or roving 30 on a first determined zone of the lay-up mould, for example on a portion of the first surface 100 of the mould. Once the application has been performed on this first zone, a cutting element 11 of the deposition head 1 cuts the strip or roving 30. After this cutting, the deposition of a first fibrous structure is thus obtained, formed by a first section of the strip or roving 30, on the first zone of the mould.

The formation of the blank is then continued by advancing the strip or roving 30 in the deposition head 1 to the pressure application element 7 by actuating the conveying element 5. The deposition head 1 can be moved in order to produce the deposition of the roving or strip 30 on a second zone of the mould. The deposition of a second fibrous structure, formed by a second section of the strip 30, on the second zone of the mould is then obtained in a similar manner to that previously described.

The production of the blank is then continued by depositing several other fibrous structures in the same way as previously described, until covering the first surface 100 and the second surface 200.

Chemical or thermal treatments can then be performed on the blank, according to the nature of the layed-up fibrous structures.

A fibrous blank if then obtained, produced by laying-up as illustrated in FIG. 9, comprising a first portion 1*b* having been layed-up on the first surface 100, and a second portion 2*c* having been layed-up on the second surface 200. The first portion 1*b* and the second portion 2*c* form a fibrous blank.

The fibrous blank if then deformed, so as to obtain a fibrous preform, by deforming the second portion 2*c* layed-up on the second surface 200 so as to extend it in the direction of extension D$_E$. The second portion 2*c* is then positioned so as to have the geometry 2*b* of the flange 2 to be produced. Through the particular geometry of the second surface 200 used to lay-up the second portion 2*c*, the second portion 2*c* deforms perfectly so that each closed curve of undulation 21, 22, 23, 24, 25 becomes a circle of the flange 2 to be produced, having a suitable diameter and such that each corrective curvature 32, 33 extends in the direction of extension D$_E$. Hence, there are no significant stresses in the fibres of the second portion, in particular at the junction between the first portion 1*c* and the second portion 2*c* deformed to the dimensions of the flange 2 to be produced.

It is then possible to proceed to the thermal treatment of the fibrous preform thus obtained, in order to form the matrix, if this step has not yet been performed, so as to obtain the final component 4, or at least an intermediate component close to the final component 4.

The methods described above can also be adapted to the production of a composite material component comprising a body having an opening in an axial direction, said component further comprising a flange around said opening in a circumferential direction and extending in a direction of extension substantially directed in the axial direction. Such a component is illustrated, for example, in FIG. 5B of document WO2012/046020. For example, it does not go beyond the scope of the invention if the composite material component has the overall shape of a pierced disc, with a cylindrical protuberance circumferentially around the orifice. In this case, the first surface will have a ring shape (in the geometric sense) having the shape of the body to be produced, which will encircle the second surface in the general form of a ring having circumferential undulations and corrective curvatures.

The invention claimed is:

1. A method for manufacturing a draping mold for producing a blank of a component made of composite material, said component comprising a body of revolution with an axis directed in an axial direction, said body extending around the axial direction in a circumferential direction, and at least one flange extending from one end of the body in a direction of extension, the method comprising:

determining a first surface of revolution of the axis directed in the axial direction having a shape of the body to be produced, said first surface extending around the axial direction in the circumferential direction, determining a second surface situated in a prolongation of the first surface in a prolongation direction, an angle formed between the axial direction and the prolongation direction being greater than an angle formed between the axial direction and the direction of extension, the second surface having closed curves of undulation in the circumferential direction continuing successively in the prolongation direction, each of the closed curves of circumferential undulation corresponding to a circle belonging to the at least one flange to be produced, and a curvilinear length of said closed curves each corresponding to a value of a perimeter of said circle corresponding thereto, wherein the second surface also has corrective curvatures in the prolongation direction, such that all the points of each of the closed curves of circumferential undulation are at a same curvilinear distance from a junction between the first surface and the second surface, said curvilinear distance belonging to the second surface and having a value corresponding to the curvilinear distance between the circle belonging to the at least one flange to be produced corresponding to said closed curves, and the junction between the at least one flange and the body to be produced, and manufacturing the draping mold based on at least the determined first surface and second surface.

2. The method according to claim 1, wherein points of inflection of each of the closed curves of circumferential undulation are on the same circle.

3. The method according to claim 1, wherein a minima of each of the closed curves of circumferential undulation are on the same circle, a radius of which is greater than or equal to the radius of the same circle producing the junction between the first surface and the second surface.

4. The method according to claim 1, wherein the corrective curvatures situated on a maxima of the circumferential undulations are more curved than the corrective curvatures situated on points of inflection of the circumferential undulations.

5. The method according to claim 1, wherein the at least one flange to be produced comprises a fillet at its junction with the body to be produced.

6. A method for manufacturing a composite material component comprising a body of revolution with an axis directed in an axial direction, said body extending around the axial direction in a circumferential direction, and at least one flange extending from one end of the body in a direction of extension, the method comprising:

producing a lay-up mold comprising a first lay-up surface and a second lay-up surface, the first lay-up surface and the second lay-up surface respectively corresponding to at least one portion of the first surface and of the second surface determined according to the method for manufacturing the draping mold according to claim 1, forming a fibrous blank by depositing a plurality of fibrous layers on the lay-up mold comprising the first lay-up surface and the second lay-up surface, the depositing being performed by automated fibre placement, shaping a portion of the fibrous blank formed on the second lay-up surface in the direction of extension, so as to obtain a fibrous preform having the shape of the body and of the at least one flange to be produced, and densifying the preform by a matrix in such a way as to obtain the composite material component.

7. A mould for a lay-up of fibrous structures comprising a first lay-up surface and a second lay-up surface extending in a prolongation of the first lay-up surface in a prolongation direction, the first lay-up surface being a surface of revolution of an axis directed in an axial direction, said first lay-up surface extending around the axial direction in a circumferential direction, the mould being characterised in that the second lay-up surface has circumferential undulations in the circumferential direction and corrective curvatures in the prolongation direction, and the corrective curvatures situated on a maxima of the circumferential undulations are more curved than the corrective curvatures situated on points of inflection of the circumferential undulations, such that all the points of each closed curve of each of the circumferential undulations extending in the circumferential direction are at a same curvilinear distance from a junction between the first lay-up surface and the second lay-up surface, said curvilinear distance belonging to the second lay-up surface.

8. The mould according to claim 7, said mould comprising a plurality of separable parts delimited so as to allow demoulding after the lay-up.

\* \* \* \* \*